Figure 1:
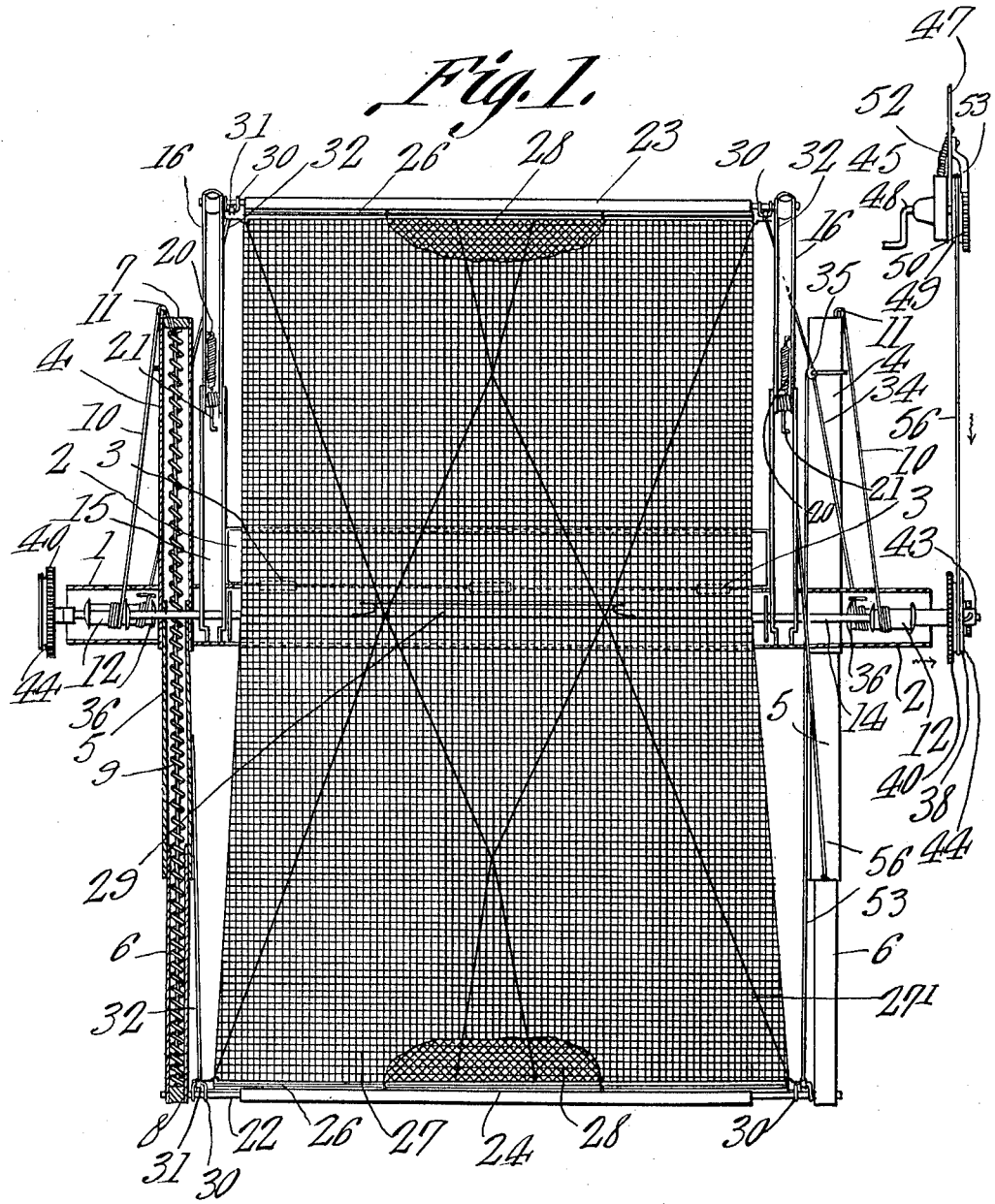

J. F. HUNTER.
FENDER.
APPLICATION FILED APR. 26, 1911.

1,040,335.

Patented Oct. 8, 1912.

4 SHEETS—SHEET 1.

Witnesses

J. F. Hunter,
Inventor by C. A. Snow & Co.
Attorneys

J. F. HUNTER.
FENDER.
APPLICATION FILED APR. 26, 1911.
1,040,335.
Patented Oct. 8, 1912.
4 SHEETS—SHEET 2.
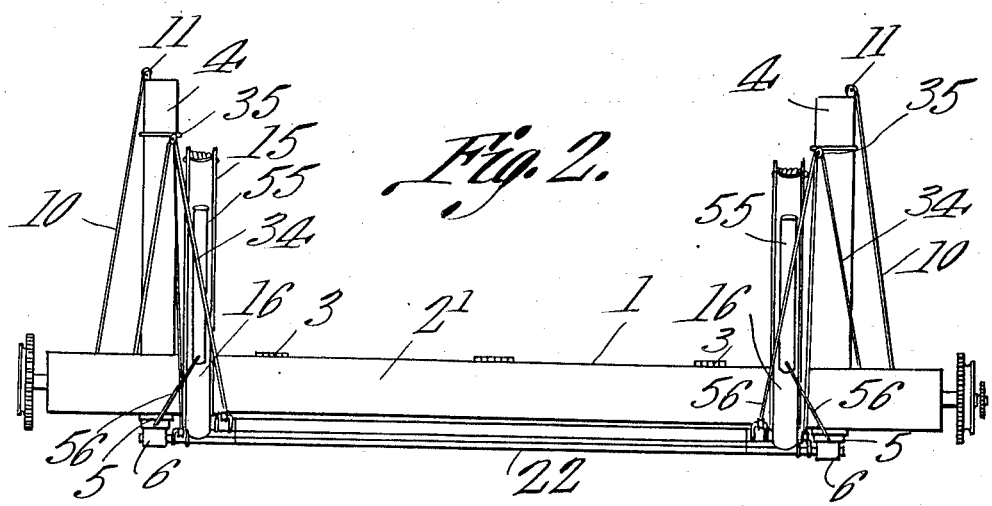
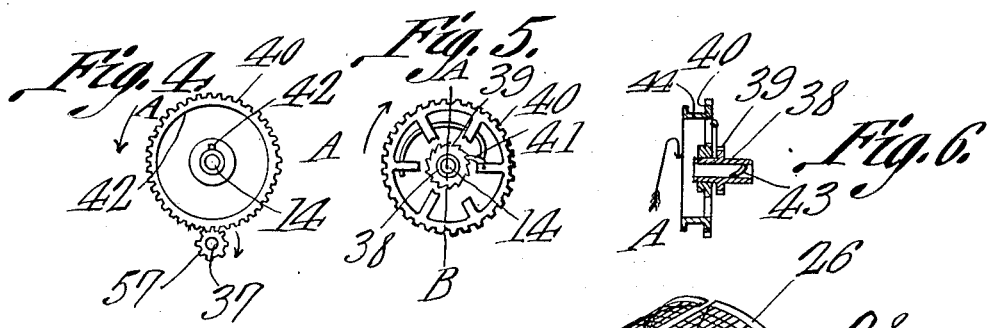
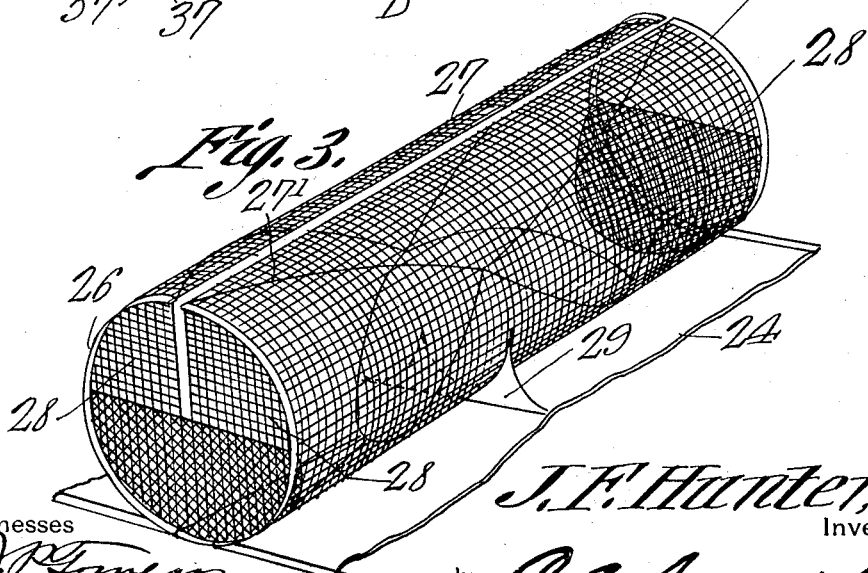
Witnesses
J. F. Hunter,
Inventor
by C. A. Snow & Co.
Attorneys

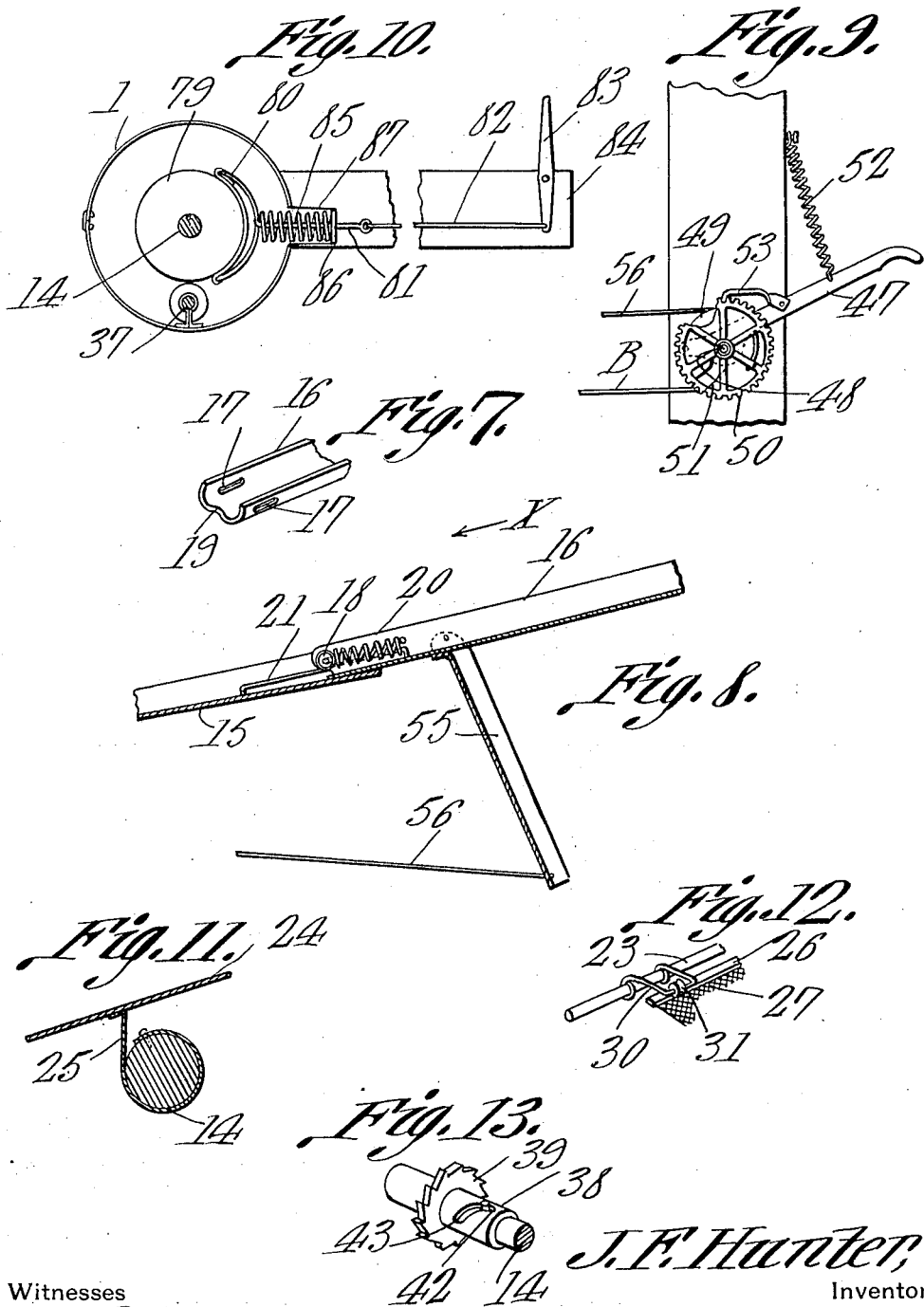

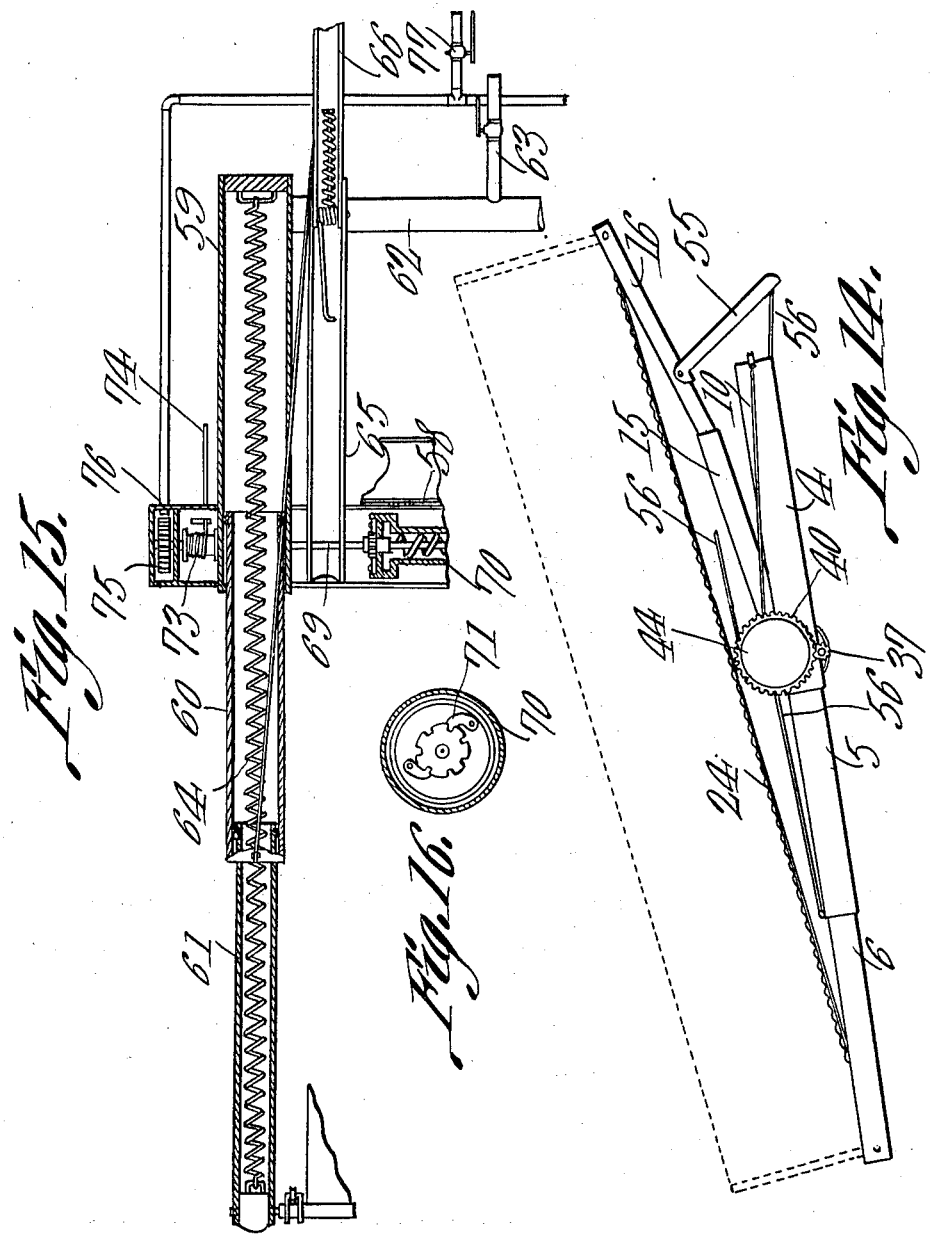

UNITED STATES PATENT OFFICE.

JAMES FOREST HUNTER, OF SIOUX RAPIDS, IOWA.

FENDER.

1,040,335.  Specification of Letters Patent.  Patented Oct. 8, 1912.

Application filed April 26, 1911. Serial No. 623,410.

*To all whom it may concern:*

Be it known that I, JAMES F. HUNTER, a citizen of the United States, residing at Sioux Rapids, in the county of Buena Vista and State of Iowa, have invented a new and useful Fender, of which the following is a specification.

The device forming the subject matter of this application is a fender adapted to be attached to a vehicle of any sort to receive the objects which, through accident or design, may be disposed in the path of the vehicle.

One object of the present invention is to provide a collapsible frame which may readily be extended to flatten out a net into which an object may be received.

A further object of the invention is to provide means for collapsing and extending the net-carrying frame, to provide means whereby the net may be rolled up and unrolled, and to provide suitable mechanism under the control of the occupant of the vehicle, or of the engineer of the train, whereby the device may be operated.

A further object of the invention is to provide a safety net of novel and improved form, and to provide means whereby the same may readily be restored to a position in which it will receive and embrace any object which may be cast upon it.

This specification is accompanied by a series of drawings, in which the nature of the invention is set forth.

I do not bind myself to the specific constructions shown, since these constructions are typical merely. Many changes will readily suggest themselves, and these changes, when falling within the scope of common mechanical skill, may be made without jeopardizing the utility of the invention.

In order that the main features of the invention may not be obscured by a multiplicity of unimportant details, I have omitted any modifications which will suggest themselves to a person skilled in the art, after an examination of the following specification.

In the drawings,—Figure 1 is a top plan of the device, the flexible portion of the structure being flattened out for the reception of any object which may be projected thereon; Fig. 2 is a top plan, showing the flexible portion of the structure reeled within the case, the mechanism whereby the flexible portion is carried, being folded into small compass; Fig. 3 is a perspective view of the supplemental net, and of a portion of the main net wherewith the supplemental net is connected, the view depicting the supplemental net in the position which it will assume after an object has been engaged thereby; Fig. 4 is an end elevation of the shafts whereby the nets are manipulated, the view showing the mechanism whereby the shafts are operatively connected; Fig. 5 is a rear elevation of the upper pinion shown in Fig. 4; Fig. 6 is a fragmental transverse section upon the line A—B of Fig. 5; Fig. 7 is a perspective view of the forward end of one of the supplemental arms whereby the rear ends of the nets are supported; Fig. 8 is a fragmental longitudinal section of the mechanism whereby the rear ends of the main and supplemental nets are supported; Fig. 9 is a side elevation of the mechanism whereby the shafts shown in Fig. 4 are manually operated; Fig. 10 is a side elevation of an auxiliary brake mechanism which, when desired, may be employed; Fig. 11 is a fragmental sectional detail, showing the manner in which the main net is connected with the shaft upon which it is wound; Fig. 12 is a fragmental perspective detail showing the mechanism whereby the corners of the supplemental net are immediately engaged to hold the net flat upon the main net; Fig. 13 is a fragmental perspective view, supplemental to Fig. 6, and showing in clearer detail, the manner in which certain of the operating mechanisms are connected with the main shaft; Fig. 14 is a side elevation of the device appearing in Fig. 1, certain parts being omitted, for the sake of clearness; Fig. 15 is a sectional view showing a modified form of the invention; and Fig. 16 is a transverse section of the roller employed in connection with the structure shown in Fig. 15, the view depicting the pawl and ratchet mechanism.

In carrying out the invention there is provided a case 1, tubular in form. This case 1 is longitudinally divided into a bottom member 2 and a top member 2', hingedly connected, as shown at 3. The case 1 may be supported in any desired manner upon the vehicle frame (not shown). The opposite ends of the bottom member 2 of the case 1 carry duplicate structures, one of which will be described, it being understood, without further explanation, that the description applies with equal propriety to the other, like structure.

Projecting rearwardly from the bottom member 2 of the case 1, and rigidly secured thereto, is a tube 4, in which slides a forwardly projecting tube 5, another tube 6 sliding within the tube 5. There is a plug 7 in the rear end of the tube 4, and a plug 8 in the forward end of the tube 6. Located in the tubes 4, 5 and 6, is a compression spring 9, bearing at its forward end against the plug 8, and at its rear end against the plug 7. A flexible member 10 is secured at its forward end to the plug 8, the flexible member being carried rearwardly through the spring 9, and through the plug 7. The flexible member 10 is passed over a sheave 11, carried by the rear end of the tube 4, the flexible member being thence carried forwardly, and wound about a drum 12, carried by a shaft 14, located within the case 1, and journaled for rotation in rearwardly extended arms 15, secured to the bottom member 2 of the case 1, between the tubes 4.

The primary arms 15 are U-shaped in cross section, and other, rearwardly extended, similarly formed arms 16 fit within the arms 15. In the arms 16 (note Fig. 7), there are longitudinally extended slots 17. A pin 18 is mounted in the primary arm 15, and is located in the slot 17 of the secondary arm 16. A pivotal connection is thus afforded between the arms 15 and 16, so that the arms 16 may be folded forwardly. However, noting Fig. 8, and comparing the same with Fig. 7, it will be seen that if the secondary arm 16 is thrust forwardly, the connecting pin 18 moving in the slot 17, the end 19 of the arm 16 will be located far enough in advance of the fulcrum pin 18, so that the arm 16 will be held rigidly against movement. A compression spring 20 is secured at one end to the pin 18, and at the other end, the spring 20 is secured to the arm 16. The action of the spring 20, therefore, is to thrust the arm 16 in a direction opposite to that indicated by the arrow X, and to retract the end 19 of the arm 16, so as to hold the arms 15 and 16 in pivoted relation. Coiled in its intermediate portion about the pin 18, and extended in opposite directions, is a spring arm 21, one end of which bears upon the arm 15, the other end of the spring arm 21 bearing upon the arm 16. When the arms 15 and 16 are free, for pivotal movement, the spring 21, obviously, tends to position the parts 15 and 16 as shown in Fig. 8. The tubes 6 are connected by a bar 22, and the secondary arms 16 are connected by a bar 23. Terminally connected to the bars 22 and 23 is the main net 24. This net 24 has, in its intermediate portion, a flexible tongue 25, of canvas or the like, secured to, and adapted to be wound upon the main shaft 14. (See Fig. 11).

Secured to the bars 22 and 23, are hoops 26, having free ends, as clearly shown in Fig. 3, the hoops normally assuming a circular form. The hoops 26 carry a supplemental prehensile net 27, extended longitudinally of the main net 24, and of substantially the same length as the main net. The supplemental net 27 is reinforced by crossed cords 27'. The hoops 26 may carry closure members 28, as clearly shown in Fig. 3, these closure members, of course, being fashioned from yieldable or resilient material. The intermediate portion of the supplemental net 27 is connected with the main net 24 by a flexible tongue 29, as seen in Fig. 3.

The bars 22 and 23 carry adjacent their outer extremities, brackets 30, upon which are journaled for rotation, sheaves 31. To the ends of the forward hoop 26 are connected lines 33, which are passed over the sheaves 31 which are upon the forward bar 22. To the rear hoop 26, adjacent its ends, are connected lines 32, passed over the sheaves 31 which are upon the brackets 30 carried by the rear bar 23. The lines 32 and 33 at each side of the structure, are connected with a draw line 34, passed about a sheave 35, carried by each of the rearwardly extending tubes 4. The draw line 34 is forwardly extended, and is wound about a drum 36, carried by a supplemental shaft 37, located in the case 1, and journaled for rotation in the bottom member 2 of the case, below the main shaft 14. To the secondary arms 16 are hinged depending bars 55, the lower ends of which are united by flexible members 56 with the tubes 5.

Rotatably mounted upon the main shaft 14, adjacent one end thereof, is a collar 38, to which is fixed a ratchet 39. Rotatably mounted upon the collar 38 in close vicinity to the ratchet 39 is a pinion 40. Upon the inner face of the pinion 40 there is a spring pressed pawl 41 adapted to engage the ratchet 39. In the main shaft 14 there is a radial stud 42, adapted to register slidably in a slot 43, cut diagonally in the collar 38. The pinion 40 carries a fixed sheave 44. The construction above described may, if desired, be duplicated at both sides of the structure, as Figs. 1 and 2 will clearly indicate.

In the drawings, a fixed support 45 is shown, the same being intended to designate any suitable part of a vehicle. Fulcrumed at 46 upon the support 45, is a lever 47, carrying a shaft 48, upon which there is secured a drum 49, carrying a ratchet 50. There is a slot, arcuate in outline, in the support 45, in which the shaft 48 is adapted to move when the lever 47 is tilted, the slot being denoted by the numeral 51. The lever 47 is normally maintained uplifted by means of a spring 52, secured at one end to the lever, and at the other end secured to the support 45. There is a pawl 53, pivoted to the lever 47, and adapted to engage the ratchet 50. A belt 56 is trained about the sheave 44 and about the drum 49.

Presupposing that the tubes 4, 5 and 6 are elongated, and that the supplemental net 27 is in the tubular form shown in Fig. 3, the secondary arm 16 being locked in rearwardly extended position, the operation of the device is as follows.

If the shaft 48 be rotated, by hand, by power from the engine, or otherwise, in the direction of the arrow B of Fig. 9, the belt 56 will transmit motion to the pulley 42, rotating the pulley 42 and pinion 40 in the direction of the arrow A in Figs. 4, 5 and 6. When the pinion 40 is thus rotated, the pawl 41 will slip over the ratchet 39. The frictional engagement between the pinion 40 and the collar 48, will cause a slight rotation of the collar 48, the main shaft 14, however, remaining fixed, and the stud 42, of course remaining fixed likewise. When the collar 38 is thus rotated, owing to the coöperation between the stud 42 and the diagonal slot 43 in the collar 48, the collar will be advanced longitudinally, carrying with it the pinion 40. The lateral movement of the pinion 40 will bring the said pinion into mesh with a pinion 57 secured to the supplemental shaft 37, and normally out of alinement with the pinion 40. The pinion 40 will thus be operatively connected with the shaft 37. The pinion 40 cannot now operate the main shaft 14, for the reason that the pinion 40 is loose upon the collar 38.

A continued rotation of the pinion 40 and of the shaft 37, will cause a rotation of the drums 36, the drums 36 reeling in the draw line 34, and causing the front and rear lines 33 and 32 respectively, which are connected with the hoops 26, to flatten out the hoops 26, and to distend the supplemental net 27, upon the top of the main net 24. The ends of the hoops 26 will ultimately snap beneath the sheaves 31, the supplemental net 27 being thus held flat upon the main net 24. If a mail bag, a human being, or any other object is now interposed in front of the device, such object will be projected upon the supplemental net 27. The shock thus imposed upon the supplemental net will cause the ends of the hoops 26 to snap away from beneath the sheaves 31, the supplemental net closing into the tubular form shown in Fig. 3, and retaining the object which has been projected thereon. The draw line 34, during the closing together of the net 27, will run freely off the drum 36, owing to the fact that, by reversing the rotation of the pinion 40, through the instrumentality of the belt 56, the drum 49 and the shaft 48, the pinion 40 will have been moved laterally out of mesh with the pinion 57 which is upon the supplemental shaft 37, so that the supplemental shaft 37 will be free to rotate under the pull exerted upon the draw lines 34 by the resilient hoops 26.

The operation above described, illustrates in what manner the supplemental net 27 is flattened out, and disposed in tubular form, as soon as struck by an object, and I will now describe the manner in which the entire device may be disposed in the compact form depicted in Fig. 2.

Presuppose that the shaft 48 is rotated in an opposite direction to that hereinbefore described in connection with the flattening out of the supplemental net 27. Under such circumstances, rotation will be imparted to the pinion 40 in a direction contrary to that indicated by the arrow A in Figs. 4, 5 and 6. Under such circumstances, the pinion 40 will be drawn laterally out of mesh with the pinion 37, the pawl 41 engaging the ratchet 39 and causing a rotation of the collar 38, the collar 38 being operatively connected with the main shaft 14 through the instrumentality of the pin and slot connection 42—43. When the main shaft 14 is thus rotated, the secondary arm 16 having been unlocked from the primary arm 15 by the action of the spring 20, the line 56 will be loosened, setting free the bar 55. At the same time, the drums 12, being rotated with the main shaft 14, will reel in the flexible members 10, telescoping the tube 6 within the tube 5 and telescoping the tube 5 within the tube 4, the springs 9 being put under compression. At the same time, the main net 24 will be reeled in upon the main shaft 14, the supplemental net 27, in flattened out form, being reeled in along with the main net 24. This reeling in of the main net 24 will fold the arms 26 forwardly. The device will thus be disposed in the compact form shown in Fig. 2, and will be thus held because of the engagement between the pawl 53 which is upon the lever 47, and the ratchet 50.

When it is desired to project and to open the device, the lever 47 is tilted slightly, the shaft 48 swinging upon an arc of which the fulcrum 46 of the lever 47 is a center. The centers of rotation of the shafts 48 and 14 will thus be brought nearer together slacking away the belt 56. Under such circumstances, the compression springs 9 will be set free, projecting the net into the position shown in Fig. 1, the secondary arms 16 being swung rearwardly through the action of the springs 21 which, during the forward folding of the arms 16, will have been put under compression. As the tube 5 is projected, the line 56 will be tightened, tilting the bar 55 and swinging the arms 16 rearwardly. The tension of the net 24 upon the arms 16, will slide the arms in the direction of the arrow X, advancing the end 19 of the arm 16 and locking the arm.

In the form of the invention shown in Fig. 15, the case is denoted by the numeral 58, the case carrying the rearwardly projecting tubes 59, in which tubes 60 are slidable, tubes 61 being slidable in the tubes 60. The tubes 59 are connected by a pipe 62, to which fluid pressure is supplied by a pipe 63. Within the tubes 60, 59 and 61 retractile springs 64 are located, the springs at one end being connected with the tubes 61, and at the other end with the tubes 59. The primary arm 65 is secured to the case 58, and the secondary arm 66 is pivoted to the primary arm 65, as before.

Located within the case 58 and mounted in the primary arm 65, is a shaft 69. Rotatable upon the shaft 69 and located within the case 58 is a roller 70, held operatively upon the shaft 69 by means of pawl and ratchet mechanism 71. (See Fig. 12.) One end of a spring 72 is connected to the roller 70, the other end of the spring 72 being secured to the shaft 69. The construction above described, resembles the ordinary "Hartshorn" spring actuated curtain roller and need not be described at greater length. It is upon the roller 70, that the main and supplemental nets are adapted to be wound.

Loose upon the shaft 69, are drums 73, upon which draw lines 74 are wound. These draw lines, as hereinbefore described, serve as a means whereby the supplemental net is flattened out, to engage beneath the sheaves 31. Located at the ends of the case 58, are operating mechanisms 75, actuated by fluid pressure from pipes 76, in which is located a three way valve 77. The operating mechanisms 75 are merely turbines adapted to be actuated by fluid pressure. The same may be of any desired form, and there are many devices which are accessible commercially for use in the position shown.

I do not claim to have invented any specific form of turbine for use in this machine, and a specific delineation of one of the mechanisms 75 is therefore unnecessary.

The members 75 are operatively connected with the drums 73.

Presupposing that the tubes 60 and 61 are retracted, the operation of the device is as follows: When fluid pressure is admitted into the tubes 59, 60 and 61, through the pipes 63 and 62, the tubes 60 and 61 will be shot forwardly, stretching out the main net 24, and with it the supplemental net 27 which is flattened out thereon, the supplemental net engaging beneath the sheaves 31. When the nets are thus drawn off the drum or roller 70, the spring 72 will be put under tension, the pawl and ratchet mechanism 71 preventing a rewinding of the nets.

The device is then operative to receive any object which may be projected upon the nets. When such objects strike the nets, the ends of the hoops 26 will be released from the sheaves 31, permitting the supplemental net to assume the tubular form shown in Fig. 3. During the time that the supplemental net is assuming the tubular form hereinbefore referred to, the lines 74 will pay freely off the drums 73, permitting the supplemental net 27 to close together, the opening of the three way valve 77 relieving the fluid pressure upon the mechanisms 75.

When it is desired to flatten out the supplemental net 27, so as to cause the ends of the hoops 26 to engage beneath the sheaves 31, the valve 77 is manipulated, admitting fluid pressure into the pipes 76, and actuating the members 75, thereby operating the drums 73 and reeling in the flexible members 74, whereupon the supplemental net 27 will be flattened out upon the main net 24 and be rendered operative to receive another object.

If desired, as shown in Fig. 10, suitable brake mechanism may be supplied for controlling the operation of the shaft 12. Upon the shaft 12 may be located a friction drum 79, adapted to be engaged by a shoe 80, carried by the end of a rod 81, connected by means of a rod 82, with a lever 83, fulcrumed upon any suitable support 84, the same being some portion of the vehicle upon which the device is mounted. The shoe 80 is pressed against the friction drum 79, by means of a spring 85, engaging the shoe at one end, and at the other end engaging a projection 86 outstanding from an arm 87, secured to the case 1.

Having thus described the invention, what is claimed is:—

1. In a device of the class described, a supporting structure; a net thereon which is spring-constrained to assume a tubular form to inclose an object projected thereon; and means for holding the net in flat form upon the supporting structure to receive the object.

2. In a device of the class described, a supporting structure; a tubular supplemental net thereon which is spring-constrained to assume a tubular form to inclose an object projected thereon; means upon the supporting structure to engage the net to hold the same in flat form upon the supporting structure to receive the object; and a device for flattening the supplemental net to engage with said means.

3. In a device of the class described, a main net; a supplemental net thereon which is spring-constrained to assume a tubular form; means for holding the supplemental net flattened out upon the main net; and means for rolling up both nets together.

4. In a device of the class described, a main net; a supplemental net thereon which is spring-constrained to assume a tubular form; means for maintaining the supplemental net in flattened out condition upon the main net; and telescoping means for elongating both nets.

5. In a device of the class described, a main net; a supplemental net thereon which is spring constrained to assume a tubular form; means for holding the supplemental net in flattened out condition upon the main net; means for rolling up both nets together; and telescoping means for elongating both nets, to unroll the same.

6. In a device of the class described, a supporting member; shafts journaled for rotation therein; a main net; a supplemental, prehensile net carried by the main net, both nets being adapted to be wound upon one shaft; means operatively connected with the other shaft for flattening out the supplemental net upon the main net; means for alternately connecting and disconnecting the shafts; and means for rotating one of the said shafts.

7. In a device of the class described, spaced shafts; a pinion upon one shaft; a collar upon the other shaft, a pinion rotatable upon the collar; interengaging elements between the collar and its shaft, to move the collar longitudinally and to bring the pinions alternately in mesh and out of mesh with each other; pawl and ratchet mechanism operatively connecting the sleeve-carried pinion with the sleeve; a main net and a supplemental net, the latter being prehensile, and both nets being adapted to be wound upon one shaft; and means operatively connecting the supplemental net with the other shaft to secure a flattening out of the supplemental net upon the main net.

8. In a device of the class described, a lever; a shaft journaled for rotation in the lever; means for rotating the shaft; a drum upon the shaft; pawl and ratchet mechanism operatively connecting the lever with the drum; a second shaft; a net controlled by said second shaft; and a belt connecting the drum with said second shaft.

9. In a device of the class described, spaced shafts; a main net; a supplemental, prehensile net carried by the main net, both nets being adapted to be wound upon one of the shafts; means for flattening out the supplemental net upon the main net, said means being operatively connected with the other shaft; and means for operating both shafts alternately.

In testimony that I claim the foregoing as my own, I have hereto affixed my signature in the presence of two witnesses.

JAMES FOREST HUNTER.

Witnesses:
JOHN W. FEIOCK,
DAVID AFFALTER.

---

Copies of this patent may be obtained for five cents each, by addressing the "Commissioner of Patents, Washington, D. C."